United States Patent Office 3,124,569
Patented Mar. 10, 1964

3,124,569
SUBSTITUTED AZETIDINE COMPOUNDS
Emilio Testa, Vacallo, Ticino, Switzerland, and Luigi Fontanella and Giulio Maffii, Milan, Italy, assignors to Lepetit S.p.A., Milan, Italy
No Drawing. Filed Dec. 18, 1959, Ser. No. 860,314
Claims priority, application Great Britain Dec. 23, 1958
6 Claims. (Cl. 260—239)

This invention is concerned with new pharmacologically active compounds. More particularly, the invention is concerned with pharmacologically active N-alkylazetidines of the formula

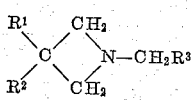

wherein $R^1$ and $R^3$ represent hydrogen, lower alkyl, cycloalkyl, aryl and aralkyl radicals; and $R^2$ represents lower alkyl, cycloalkyl, phenyl or phenylalkyl radicals, and with their quaternary addition salts.

The compounds of the invention have been found to possess adrenolytic and hypotensive activity. For instance 1-ethyl-3-phenylazetidine is active at less than 10 mg./kg. on subcutaneous administration to rats. A particular property of the compounds of this class is that of antagonizing not only adrenaline, as it usually occurs with all hypotensive compounds, but also noradrenaline. On the contrary, the quaternary addition salts of the new compounds are active as sympatholytic agents.

The low toxicity of all compounds of the invention allows their administration in therapeutically effective doses.

The process of the invention consists in hydrogenating a 3-substituted azetidine of the formula

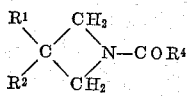

wherein $R^1$ and $R^2$ have the above significance, $R^4$ besides the above significance for $R^3$ can represent also an alkoxy group, with an excess of lithium aluminum hydride in an anhydrous inert organic solvent, and if desired in converting the formed 1-alkyl-azetidine into its quaternary addition salts.

For practical purposes it is preferred to add dropwise a solution of the selected 1-acylazetidine in the desired solvent to a suspension of LiAlH$_4$ in the same solvent. Alternatively, a solution containing a 1-unsubstituted azetidine and an equivalent amount of carboxylic acid alkyl ester can be added to the LiAlH$_4$ suspension. During the addition, the 1-acylazetidine is continuously formed and is immediately hydrogenated to the desired 1-alkylazetidine in the presence of an hydrogenating agent.

The starting materials are prepared by reacting a 3-substituted azetidine of the formula:

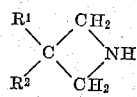

wherein $R^1$ and $R^2$ have the above-indicated significance, with the chloride or the anhydride of a carboxylic acid of the formula $R^3$—COOH, wherein $R^3$ is as above defined, if desired in the presence of a tertiary aminic base, at a temperature of 0°–120° C., as described in our copending application Serial No. 860,325, filed simultaneously herewith, now U.S. Patent 3,037,019. The 3-substituted azetidines in turn are prepared by treating a 2-azetidinone of the formula

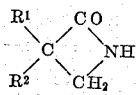

with lithium aluminum hydride in a molar ratio of 1 to about 0.8–1.5 in an anhydrous inert organic solvent such as diethyl ether or tetrahydrofuran, as described in our copending application Serial No. 860,311, likewise filed simultaneously herewith.

Processes for the manufacture of 3-substituted 2-azetidinones are described by E. Testa and L. Fontanella, Liebigs Ann. Chem. 625, 95–98 (1959), and by E. Testa, L. Fontanella, G. F. Cristiani and F. Fava, Liebigs Ann. Chem. 614, 158–66 (1958).

The following examples are illustrative of the invention.

*Example 1.—1,3-Diethyl-3-Phenylazetidine*

To a suspension of 15 g. of lithium aluminum hydride in 300 ml. of anhydrous diethyl ether a solution of 30 g. of 3-phenyl-3-ethyl-1-acetylazetidine in 200 ml. of anhydrous diethyl ether is slowly added. Then the mixture is refluxed for 2.5 hours, cooled and mixed with about 100 ml. of a 10 percent ammonium chloride solution. After filtration the ether is evaporated and the residue distilled collecting at 80–90° C./0.4–0.6 mm., yield 25 g. (89%), B.P. 160° C.

*Example 2.—1,3-Diethyl-3-Phenylazetidine*

To a suspension of 30 g. of LiAlH$_4$ in 300 ml. of anhydrous diethyl ether a solution of 100 g. of 3-ethyl-3-phenylazetidine and 63 g. of ethyl acetate in 500 ml. of anhydrous diethyl ether is slowly added. The mixture is refluxed for 2.5 hours, cooled and mixed with about 50 ml. of a 10 percent ammonium chloride solution. After filtration the solvent is separated and the residue distilled. Yield 90 g. (77%), B.P. 160° C.

*Example 3.—1,3-Diethyl-3-Phenylazetidine-Methyl Iodide*

An ether solution of 1,3-diethyl-3-phenylazetidine is treated at room temperature with an equimolecular amount (in respect of the azetidine) of methyl iodide. The oily product formed crystallizes with cooling and scraping; it is very hygroscopic. M.P. 130° C. (dec.)

*Example 4.—1-Propyl-3-Ethyl-3-Phenylazetidine*

To a suspension of 15 g. of LiAlH$_4$ in 150 ml. of anhydrous diethyl ether a solution of 50 g. of 3-ethyl-3-phenylazetidine and 36.5 g. of ethyl propionate in 250 ml. of anhydrous diethyl ether is slowly added. The mixture is refluxed for 3 hours, cooled and mixed with about 25 ml. of a 10 percent ammonium chloride solution. After filtration the ether is separated and the residue is distilled. B.P. 90–95°/0.4 mm.; yield 49 g. (85%).

*Example 5.—1-Ethyl-3-Phenylazetidine*

To a suspension of 15 g. of LiAlH$_4$ in 300 ml. of anhydrous diethyl ether a solution of 26 g. of 1-acetyl-3-phenylazetidine in 200 ml. of anhydrous diethyl ether is slowly added. The mixture is then refluxed for 2 hours, cooled and mixed with about 100 ml. of a 10 percent ammonium chloride solution. After filtration the ether is evaporated and the residue distilled. Yield 20 g. (83%); B.P. 112–117° C./9 mm.

*Example 6.—1-Ethyl-3-Phenylazetidine*

To a suspension of 30 g. of LiAlH$_4$ in 300 ml. of anhydrous diethyl ether a solution of 82 g. of 3-phenylazetidine and 63 g. of ethyl acetate in 500 ml. of anhydrous diethyl ether is slowly added. The mixture is treated as described in the above Example 5 and gives 75% of 1-ethyl-3-phenylazetidine.

*Example 7.—1-Ethyl-3-Phenylazetidine Methyl Iodide*

The compound, prepared as described in Example 3, has M.P. 110–116° C.

*Example 8.—1-(2-Bromobenzyl)-3,3-Dimethylazetidine*

To a suspension of 15 g. of LiAlH$_4$ in 200 ml. of diethyl ether a solution of 40 g. of 1-(2-bromobenzoyl)-3,3-dimethylazetidine (prepared from 3,3-dimethylazetidine and 2-bromobenzoyl chloride by conventional processes, B.P. 140–150° C./0.6–0.8 mm.) in 300 ml. of diethyl ether is slowly added. The mixture is then treated as described in Example 1. Yield 86%. B.P. 95–97°C.

*Example 9.—1-(2-Bromobenzyl)-3,3-Dimethylazetidine Methyl Iodide*

It is prepared according to the process described in Example 3. M.P. 130–140° C.

*Examples 10 to 15*

According to the process described in Example 1, the following azetidines are prepared. Yields and boiling points are given.

1-n-butyl-3-ethyl-3-phenyl, Y. 87%, B.P. 90°/0.2.
1-n-pentyl-3-ethyl-3-phenyl, Y. 75%, B.P. 98–100°/0.4.
1-iso-pentyl-3-ethyl-3-phenyl, Y. 84%, B.P. 95°/0.2.
1-ter-pentyl-3-ethyl-3-phenyl, Y. 88.5%, B.P. 88–90°/0.3.
1-phenylethyl-3-ethyl-3-phenyl, Y. 60%, B.P. 130°/0.2.
1-phenylpropyl-3-ethyl-3-phenyl, Y. 78.5%, B.P. 150°/0.4.

*Examples 16 to 24*

According to the process described in Example 2, the following azetidines are prepared.

1-n-propyl-3-ethyl-3-phenyl, Y. 99.5%, B.P. 90–95°/0.4.
1-benzyl-3-ethyl-3-phenyl, Y. 65%, B.P. 138–140°/0.4.
1-ethyl-3-methyl-3-phenyl, Y. 69%, B.P. 62–65°/0.6.
1-ethyl-3-n-propyl-3-phenyl, Y. 69%, B.P. 80–82°/0.2.
1-ethyl-3-isopropyl-3-phenyl, Y. 79%, B.P. 80–82°/0.5–0.6.
1-ethyl-3-n-butyl-3-phenyl, Y. 70%, B.P. 83–85°/0.6.
1-ethyl-3-phenyl-3-benzyl, Y. 81%, B.P. 130–134°/0.5–0.6.
1-ethyl-3-phenyl-3-cyclohexyl, Y. 74%, B.P. 120–123°/0.2–0.3.
1-cinnamyl-3-methyl-3-phenyl, Y. 85%, B.P. 130–133°/0.4.

*Example 25.—1-Methyl-3-Phenyl-3-Ethylazetidine*

It is prepared from 38 g. 1-carbethoxy-3-phenyl-3-ethylazetidine according to the process described in Example 1. Yield 25 g. (88%). B.P. 85–90°/0.4 mm.

We claim:
1. 1-ethyl-3-phenylazetidine.
2. 1-ethyl-3-phenylazetidine methyl iodide.
3. 1,3-diethyl-3-phenylazetidine.
4. 1-propyl-3-ethyl-3-phenylazetidine.
5. 1-(2-bromobenzyl)-3,3-dimethylazetidine.
6. 1-(2-bromobenzyl)-3,3-dimethylazetidine methyl iodide.

References Cited in the file of this patent

Mannich et al.: Berichte, vol. 70, pages 210, 213 (1937).

Mannich et al.: Berichte, vol. 72–B, pages 409–505 (1939).

Degering: Organic Nitrogen Compounds, pages 491–92 (1945).

Gaylord: Reduction with Complex Metal Hydrides, Interscience Publishers, Inc., New York, N.Y., 1956, pages 569–578.